United States Patent [19]

Le Van

[11] 4,004,422
[45] Jan. 25, 1977

[54] METHOD AND APPARATUS FOR UTILIZING MOVING TRAFFIC FOR GENERATING ELECTRICITY AND TO PRODUCE OTHER USEFUL WORK

[75] Inventor: Wayne P. Le Van, New York, N.Y.

[73] Assignee: Van Allyn, Inc., New York, N.Y.

[22] Filed: Apr. 14, 1975

[21] Appl. No.: 567,650

[52] U.S. Cl. .................................. 60/533; 417/229; 60/668

[51] Int. Cl.² ............................................. F03G 5/00

[58] Field of Search ...................... 417/229; 60/533

[56] References Cited
UNITED STATES PATENTS

| | | | |
|---|---|---|---|
| 159,660 | 2/1875 | Faivre | 417/229 |
| 1,391,503 | 9/1921 | Register | 417/229 |
| 2,020,361 | 11/1935 | Johnston | 417/229 |
| 2,333,614 | 11/1943 | Boyd | 417/229 |

*Primary Examiner*—Allen M. Ostrager

[57] ABSTRACT

A method and apparatus for producing useful work by utilizing the weight of moving traffic by incorporating in a roadway or traffic-way a readily deformable chamber which is filled with a fluid arranged so that the weight of a vehicle in passing thereof affects a displacement of the fluid therein. The energy of the displaced fluid in turn is translated into mechanical or electrical energy.

8 Claims, 4 Drawing Figures

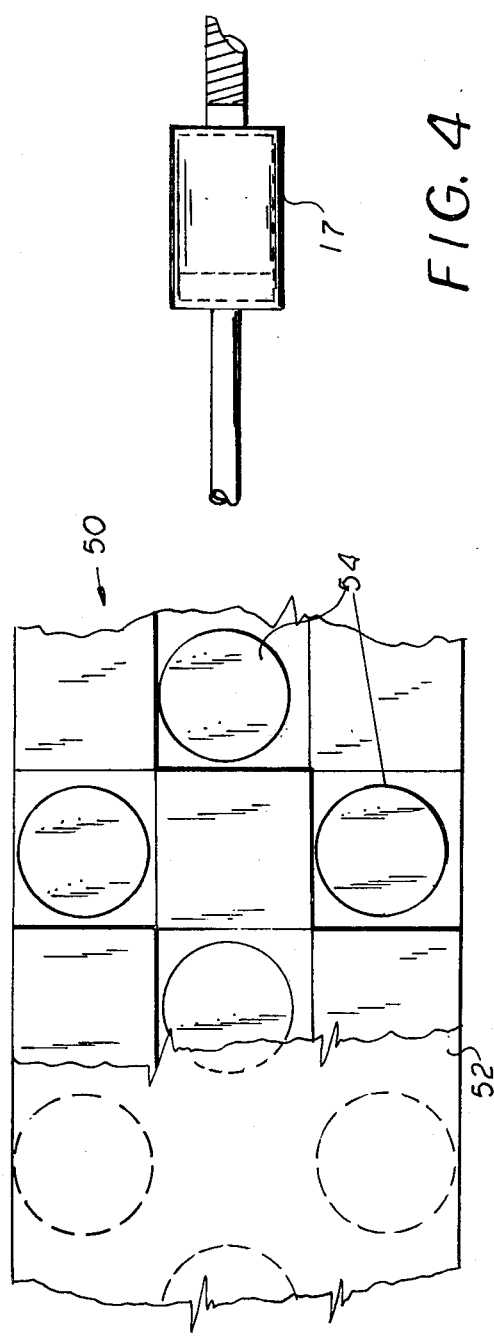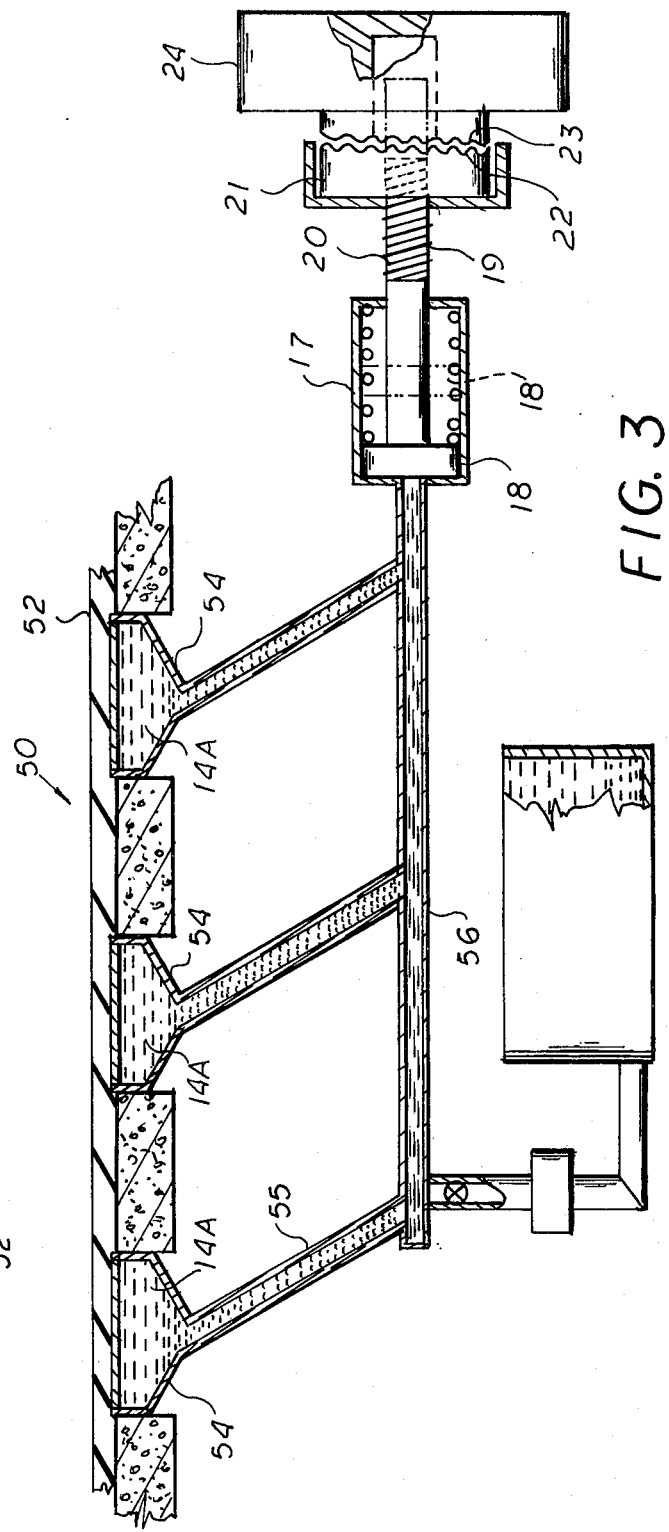

METHOD AND APPARATUS FOR UTILIZING MOVING TRAFFIC FOR GENERATING ELECTRICITY AND TO PRODUCE OTHER USEFUL WORK

PROBLEM & PRIOR ART

Heretofore many methods and apparatus have been proposed for producing useful work, e.g., generating electricity and/or mechanical work. Generally the basic source of energy comprised the conventional forms, such as wind, water, solar, nuclear or steam power produced by burning fuels such as coal, oil or gas. All of these methods and/or apparatus required a basic power source which required high capital investments or expense.

Objects

An object of this invention is to provide a method and apparatus for producing useful work which is not dependent upon the conventional basic energy source such as coal, oil or gas.

Another object of this invention is to utilize a heretofore untapped source of energy for the production of useful work.

Another object of this invention is to utilize the energy of moving traffic, e.g., vehicle or pedestrian traffic to form useful work.

Another object is to provide a method and apparatus whereby the energy developed by traffic flow over a given roadway can be readily translated into useful work.

BRIEF SUMMARY OF INVENTION

The foregoing objects and other features and advantages are attained by a method and apparatus for utilizing the flow of moving traffic, e.g., vehicle or pedestrian traffic to generate electricity or to produce other useful work. This is attained by incorporating in a roadway a flexible chamber which can be readily deformed as the moving traffic flows thereover. Confined within the chamber is a fluid, preferably an incompressible fluid. Operatively associated with the fluid chamber and connected in communication therewith is a piston assembly. The arrangement is such that the displacement of the confined fluid within the chamber effects a corresponding displacement of the piston. Operatively connected with the piston is a drive shaft which is suitably connected to a prime mover, e.g., an electrical generator or other work producing machine. In operation the periodic passage of a vehicle or pedestrian over the flexible chamber effects successive displacement of the confined fluid thereby driving the piston, the displacement of which is translated into useful work.

Features

A feature of this invention resides in the provision of utilizing the weight of moving traffic to perform useful work.

Another feature resides in the provision of utilizing the energy of a confined, incompressible fluid which is periodically displaced by the flow of moving traffic passing thereover.

Another feature resides in the provision wherein electrical energy can be readily produced close to the ultimate place of use.

Other features and advantages will become more readily apparent when considered in view of the drawings and specification in which:

FIG. 3 is a diagrammatic showing of a modified embodiment with parts shown in section.

FIG. 4 is a fragmentary plan view of FIG. 3.

DETAILED DESCRIPTION

This invention is directed to a method and apparatus for producing useful work, e.g., generating electrical energy by utilizing the power or weight of moving traffic be it vehicle traffic or pedestrian traffic. This is accomplished by constructing a roadway or traffic-way 10 over which traffic flows with a moveable portion or section which is displaced as traffic passes thereover. Associated with the moveable portion is a chamber 14 containing a confined fluid or liquid 14A. The arrangement is such that whenever a vehicle or pedestrian passes over the fluid filled chamber, the weight causes a portion of the fluid or liquid to be displaced. The displacement of the fluid or liquid 14A is translated into useful work, e.g., turning a generator to produce electricity.

Figure 2:
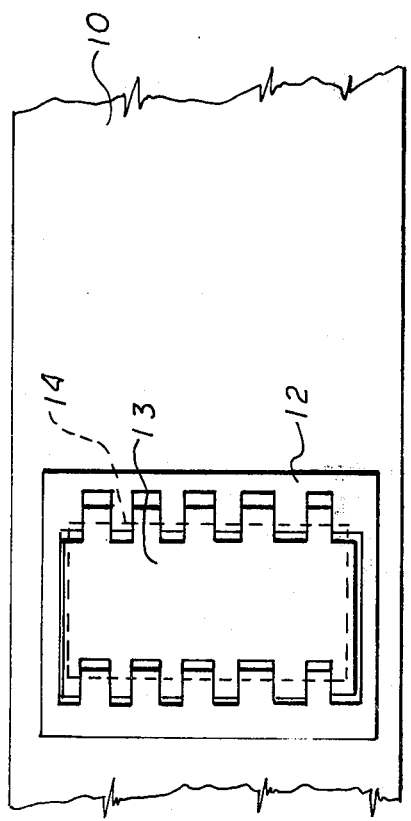
FIG. 2 is a fragmentary plan view of FIG. 1.
Figure 1:
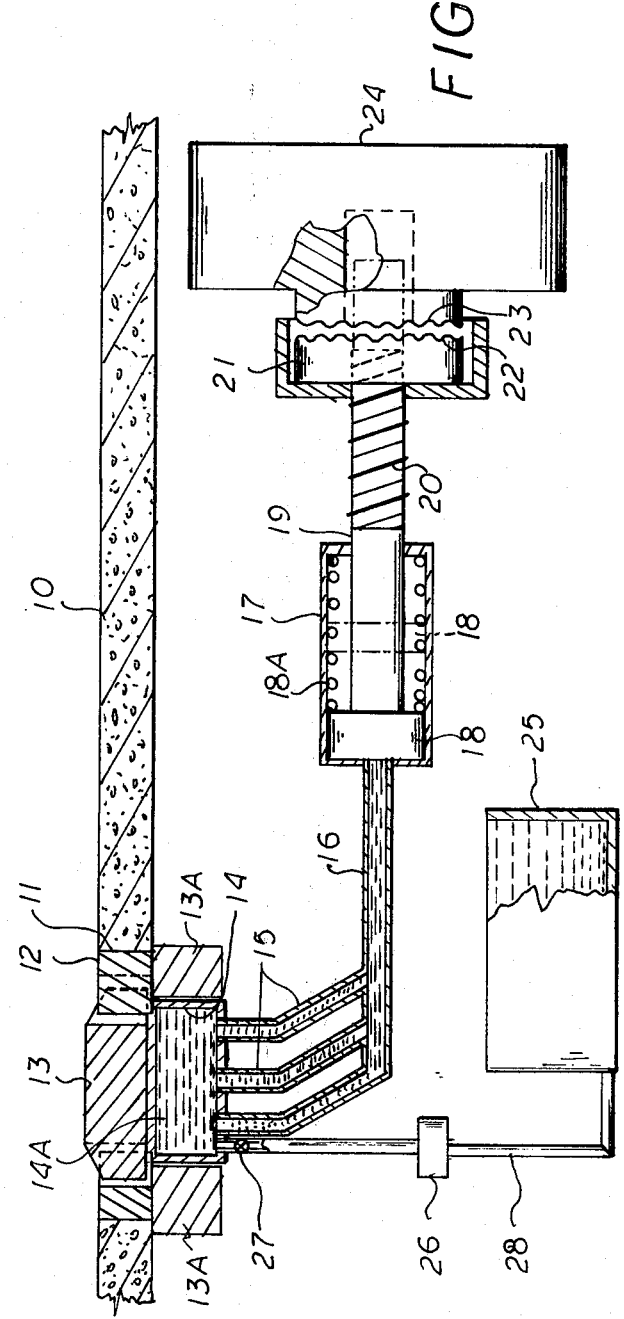
FIG. 1 is a diagrammatic showing of an apparatus embodying the invention with parts shown in section.

Referring more specifically to FIGS. 1 and 2 of the drawing, there is illustrated an apparatus whereby the displaced fluid or liquid 14A can be readily transformed into useful work. As shown the roadway 10 is provided with a moveable section which is displaced as traffic flows thereover. This is attained by constructing an opening 11 in the roadway 10. The opening 11 is then fitted with a frame 12. Loosely supported within the frame 12 is a hit or contact plate 13.

Disposed immediately beneath the contact plate 13 is a resilient chamber 14 which defines an expansible chamber. As shown the chamber 14 is closely confined in opening 11. The arrangement is such that the hit or contact plate 13 rests on the top of chamber 14. Spaced from the hit or contact plate 13 and circumscribing the chamber 14 is a stop plate 13A. The stop plate 13A functions to limit the downward movement of the hit plate 13 as will be hereinafter described.

Connected in communication with chamber 14 are one or more conduits or ducts 15 which interconnects the chamber 14 to a main or manifold conduit 16. As it will be noted the cross sectional area of the chamber 14 is substantially greater than the cross sectional area of the manifold conduit 16.

The outlet end of the manifold conduit connects with a cylinder 17 which has disposed therein a moveable piston 18 to define a second expansible chamber. A piston spring 18A is disposed between the piston 18 and an end wall of the cylinder 17 for normally biasing the piston 18 toward its inoperative retracted position as noted by the solid line shown in FIG. 1.

Confined between the piston 18 and the walls of chamber 14 is a fluid, preferably an incompressible liquid or oil 14A. It will therefore be noted that as a vehicle passes over the hit or contact plate 13, the weight of the vehicle will cause a down displacement of the hit plate 13. In doing so the volume of chamber 14 is decreased causing the liquid therein to be displaced to the manifold conduit and into the cylinder. As the displaced fluid 14A enters the cylinder, the pressure thereof acting on the piston overcomes the bias of spring 18A whereby the piston is displaced to the right as seen in FIG. 1.

Operatively connected to the piston is a piston or drive shaft 19. As shown, the extended end of the drive shaft 19 is provided with a spiral or helical land 20. The helical land of the drive shaft is operatively connected to a unidirection clutch 21. Operatively associated with the clutch 21 is a driving gear 22. A complementary driven gear 23 is suitably connected to a flywheel of an electrical generator or other suitable work producing machine 24.

Because of the relative large cross-sectional ratio between the area of chamber 14 and the area of the manifold conduit 16, it will be noted that a relative small displacement of the chamber 14 effects a relatively great displacement of the piston 18. The connected drive shaft 19 is therefore linearly displaced a corresponding greater amount.

In operation, as moving traffic passes over the hit or contact plate 13, the weight thereof causes the hit plate 13 to be downwardly displaced. In doing so, the chamber 14 is depressed a corresponding amount. Because chamber 14 is filled with a confined, incompressible liquid 14A, the liquid is displaced through ducts 15 and 16. In doing so, the piston 18 is advanced, shifting the drive shaft. The drive shaft 19 is drivingly connected to a unidirectional clutch 21. As the clutch is driven, it engages the driven gear of a work producing machine 24, e.g., an electrical generator or other work producing machine.

Upon the passage of traffic over hit plate 13, the spring 18A acting on the piston tends to restore the piston 18 to its normal inoperative position and thereby permitting the chamber 14 to be restored to its initial position. With a steady flow of traffic passing over a hit plate 13 located in a roadway, a continuous actuation of the piston and drive shaft is effected. It will be understood that one or more hit plates 13 may be arranged in a roadway so as to attain maximum benefit of the moving traffic thereon.

To maintain the chamber 14 at proper pressure at all times, a reservoir 25 filled with liquid 14A is connected in communication with chamber 14. As shown, a pump 26 is disposed in the supply line or pipe 28 which connects the reservoir to the chamber 14. To prevent back flow of the liquid, a one way valve 27 is disposed in the line 28 between the pump 26 and the chamber 14. While the illustrated embodiment shows the make-up liquid being supplied to the chamber 14 to maintain the pressure of the system, it will be understood that the make-up liquid may be introduced into the chamber or ducts 15 or 16.

FIGS. 3 and 4 illustrate a modified embodiment of the invention which is particularly adapted for converting the weight of moving pedestrian traffic into useful work. Thus the embodiment to be now described can be readily incorporated into hallways, stairs or sidewalks of well travelled areas. In this embodiment, the trafficway 50, be it a floor, sidewalk, stairs or the like is provided with a series of openings for receiving a chamber 54. The chamber 54, as previously described, is made of a deformable material which is capable of deflecting when the weight of a pedestrian is exerted thereon. Each chamber is preferably formed with a sloping bottom wall which converges to a duct 15. Ducts 15 communicating with each of the respective chambers 14 in turn connect with a manifold conduit 56, which in turn is connected to a piston and cylinder assembly 17 and 18 as described with respect to FIGS. 1 and 2.

Disposed over the floor or traffic way 50 to conceal the tops of chamber 54 is a mat, e.g., a rubber mat or like suitable covering. Thus, in operation, as a pedestrian travels over the covering mat, and deflectable chamber 54 disposed therebeneath, the weight of the pedestrians will cause a deflection of the chamber 14. The deflection causes the confined fluid therein to be displaced a corresponding amount. By restricting the displaced fluid by ducts 55 and 56, a substantial linear displacement of the piston can be effected. The linear displacement of the piston is translated into rotary energy through the interconnecting mechanics of a drive shaft 19 and associated unidirection clutch 21 and complementary meshing gears 22 and 23 as hereinbefore described.

It will be understood that the fluid pressure of the system is maintained by a supply reservoir and associated pump and valve in a manner similar to that hereinbefore described.

From the foregoing description it will be apparent that a heretofore unlimited and untouched source of energy has been utilized to produce useful work. It will be understood that the drive shaft may be operatively connected to drive an electrical generator as herein described or any other type of work producing machine.

While a flexible or deformable chamber 14 and 54 have been illustrated in FIGS. 1 and 2 and FIGS. 3 and 4 to effect displacement of the fluid when a vehicle or pedestrian passes thereover, it will be understood that the liquid displacement can be effected by other means. For example a piston and cylinder arrangement may be substituted for the resilient chamber 14 or 54. In such an arrangement the hit plate may be part of the piston which is forced downwardly by moving traffic into a cylinder containing the confined liquid to effect the displacement thereof accordingly.

While the invention has been described with respect to particular embodiments thereof, it will be understood and appreciated that variations and modifications may be made without departing from the spirit or scope of the invention.

What is claimed is:
1. An apparatus for producing useful work by utilizing the energy of moving traffic comprising:
   a chamber having a flexible wall portion disposed in the path of moving traffic to define a first expansible chamber,
   a cylinder,
   a conduit interconnecting said chamber into communication with said cylinder,
   said conduit having a cross-sectional area which is substantially smaller than the cross-sectional area of said chamber,
   a piston slideably disposed within said cylinder,
   said chamber and conduit defining a predetermined volume filled with a incompressible fluid which is trapped between said flexible wall portion and said piston of said first and second expansible chambers, whereby the flow of traffic over said flexible wall portion of said chamber pressurizes the trapped fluid therein to effect the displacement of said piston in response to said pressurized fluid accordingly, a work producing means operatively connected to said piston for translating the displacement of said piston into useful work, and means for restoring said piston to its initial position after the movement traffic has passed over said chamber.

2. The invention as defined in claim 1 and including: a roadway over which vehicle traffic flows, said roadway having a moveable contact member located in the plane of the roadway, and said flexible chamber being disposed contiguous to said contact member.

3. The invention as defined in claim 2 wherein said work producing means comprises a drive shaft operatively connected to said piston, a spiral drive mounted on said drive shaft, a unidirectional clutch operatively connected to said spiral drive of said drive shaft, and a driving means operatively connected to said clutch to be activated thereby when said clutch is activated.

4. The invention as defined in claim 1 and including a reservoir for containing a supply of said incompressible fluid, a supply duct connecting said reservoir into communication with said first expansible chamber, a one way valve interposed in said supply duct, and a pump means for pumping the fluid from said reservoir to said chamber filled with said liquid.

5. An apparatus for producing useful work by utilizing the energy of moving traffic comprising:

a traffic way over which traffic flows, said traffic way having a deflectable portion, a chamber having a flexible wall portion to define a first expansible chamber disposed continguous to said deflectable portion, means for maintaining said chamber filled with an incompressible fluid, a cylinder disposed in communication with said chamber, a piston slideably disposed within said cylinder to define a second expansible chamber whereby said fluid is trapped between the flexible wall of said first expansible chamber and the piston of said second expansible chamber, a drive shaft connected to said piston which is rendered responsive to the displacement of said piston when the flow of moving traffic over said deflectable portion effects displacement of said flexible wall to pressurize the fluid in said chamber and which is transmitted accordingly to said piston and, a work producing means connected to said drive shaft activated by said piston.

6. The invention as defined in claim 1 and including a drive shaft operatively connected to said piston, said drive shaft having a spiral drive, a unidirectional clutch means connected to said spiral drive, an electric generator connected in driving relationship with said clutch means, whereby said generator is driven by the displacement of said liquid acting on said piston when said moveable section is displaced by the flow of traffic thereover, and a spring means for normally biasing said piston toward an inoperative position.

7. A method of producing useful work by utilising the flow of moving traffic comprising the steps of:

locating a chamber of a flexible wall portion in the path of moving traffic defining a first expansible chamber whereby the weight of the traffic passing over said flexible wall portion effects a displacement thereof, connecting a second expansible chamber having a moveable piston in communication with said first expansible chamber, trapping an incompressible fluid between said expansible chambers so that the displacement of said flexible wall by the flow of moving traffic thereover pressurizes said incompressible fluid which transmits a fluid pressure on the moveable piston of said second expansible chamber, and translating the displacement of said piston into useful work.

8. The method as defined in claim 7 wherein the displacement of said piston is utilized to generate electricity.

* * * * *